United States Patent [19]

Kukes

[11] Patent Number: 4,492,626
[45] Date of Patent: Jan. 8, 1985

[54] HYDROFINING PROCESS FOR HYDROCARBON CONTAINING FEED STREAMS

[75] Inventor: Simon G. Kukes, Bartlesville, Okla.

[73] Assignee: Phillips Petroleum Company, Bartlesville, Okla.

[21] Appl. No.: 619,661

[22] Filed: Jun. 11, 1984

[51] Int. Cl.³ .............................................. C10G 45/00
[52] U.S. Cl. .............................. 208/251 H; 208/217; 208/254 H
[58] Field of Search ................. 208/251 H, 254 H, 217

[56] References Cited

U.S. PATENT DOCUMENTS

| | | | |
|---|---|---|---|
| 3,262,874 | 7/1966 | Gatsis | 208/216 R |
| 3,278,421 | 10/1966 | Gatsis | 208/264 |
| 3,544,450 | 12/1970 | Stine | 208/93 |
| 3,594,308 | 7/1971 | Stine | 208/86 |
| 4,411,824 | 10/1983 | Chen | 208/251 H |
| 4,415,436 | 11/1983 | Angevine | 208/251 H |
| 4,435,277 | 3/1984 | Dinh et al. | 208/251 H |
| 4,448,896 | 5/1984 | Kageyama et al. | 208/251 H |

Primary Examiner—Delbert E. Gantz
Assistant Examiner—Anthony McFarlane
Attorney, Agent, or Firm—French and Doescher

[57] ABSTRACT

A hydrocarbon-containing feedstream, which also contains metals, sulfur, nitrogen and/or Ramsbottom carbon residue, is contacted in a hydrofining process with a catalyst composition consisting essentially of an alumina support, platinum, and a promoter selected from the group consisting of scandium oxide, yttrium oxide, lanthanum oxide and oxides of elements of the lanthanide group.

10 Claims, No Drawings

HYDROFINING PROCESS FOR HYDROCARBON CONTAINING FEED STREAMS

This invention relates to a hydrofining process for hydrocarbon-containing feed streams. In one aspect, this invention relates to a process for removing metals from a hydrocarbon-containing feed stream. In another aspect, this invention relates to a process for removing sulfur or nitrogen from a hydrocarbon-containing feed stream. In still another aspect, this invention relates to a process for removing potentially cokeable components from a hydrocarbon-containing feed stream. In still another aspect, this invention relates to a process for reducing the amount of heavies in a hydrocarbon-containing feed stream.

It is well known that crude oil as well as products from extraction and/or liquefaction of coal and lignite, products from tar sands, products from shale oil and similar products may contain components which make processing difficult. As an example, when these hydrocarbon-containing feed streams contain metals such as vanadium, nickel and iron, such metals tend to concentrate in the heavier fractions such as the topped crude and residuum when these hydrocarbon-containing feed streams are fractionated. The presence of the metals make further processing of these heavier fractions difficult since the metals generally act as poisons for catalysts employed in processes such as catalytic cracking, hydrogenation or hydrodesulfurization.

The presence of other components such as sulfur and nitrogen is also considered detrimental to the processability of a hydrocarbon-containing feed stream. Also, hydrocarbon-containing feed streams may contain components (referred to as Ramsbottom carbon residue) which are easily converted to coke in processes such as catalytic cracking, hydrogenation or hydrodesulfurization. It is thus desirable to remove components such as sulfur and nitrogen and components which have a tendency to produce coke.

It is also desirable to reduce the amount of heavies in the heavier fractions such as the topped crude and residuum. As used herein the term heavies refers to the fraction having a boiling range higher than about 1000° F. This reduction results in the production of lighter components which are of higher value and which are more easily processed.

Processes used to remove components such as metals, sulfur, nitrogen and Ramsbottom carbon residue from a hydrocarbon-containing feed stream and to reduce the amount of heavies in the hydrocarbon-containing feed stream are generally referred to as hydrofining processes. One or all of the described removals and reduction may be accomplished in a hydrofining process depending on the components contained in the hydrocarbon-containing feed stream. Such removal or reduction provides substantial benefits in the subsequent processing of the hydrocarbon-containing feed streams.

It is known that an alumina supported catalyst containing platinum is an effective catalyst for a hydrofining process. However, it is always desirable to improve the performance of a catalyst and it is thus an object of this invention to provide an improved alumina supported catalyst containing platinum for a hydrofining process.

In accordance with the present invention, a hydrocarbon-containing feed stream, which also contains metals (such as vanadium, nickel, iron), sulfur, nitrogen and/or Ramsbottom carbon residue, is contacted with a catalyst composition consisting essentially of an alumina support, platinum, and a promoter selected from the group consisting of scandium oxide, yttrium oxide, lanthanum oxide and oxides of elements of the lanthanide group. The hydrocarbon-containing feed stream is contacted with the catalyst composition in the presence of hydrogen under suitable hydrofining conditions. After being contacted with the catalyst composition, the hydrocarbon-containing feed stream will contain a significantly reduced concentration of metals, primarily nickel and vanadium. Also, sulfur, nitrogen and Ramsbottom carbon residue as well as the amount of heavy hydrocarbon components will be reduced. Removal of these components from the hydrocarbon-containing feed stream in this manner provides an improved processability of the hydrocarbon-containing feed stream in processes such as catalytic cracking, hydrogenation or further hydrodesulfurization. The addition of the promoter to the alumina supported catalyst containing platinum results in an improved performance of the catalyst composition in the hydrofining process.

Other objects and advantages of the invention will be apparent from the foregoing brief description of the invention and the appended claims as well as the detailed description of the invention which follows.

The catalyst composition used in the hydrofining process to removal metals, sulfur, nitrogen and Ramsbottom carbon residue and to reduce the concentration of heavies consists essentially of an alumina support, platinum and a promoter selected from the group consisting of scandium oxide, yttrium oxide, lanthanum oxide and oxides of the elements of the lathanide group. The promoter is present in the catalyst in the oxide form whereas the platinum is in the elemental form. Scandium oxide ($Sc_2O_3$) and yttrium oxide ($Y_2O_3$) are preferred promoters.

Any suitable total concentration of platinum may be utilized. The total concentration of platinum, expressed as an element, will generally be in the range of about 0.3 to 5 weight percent based on the weight of the catalyst composition and will preferably be in the range of about 0.5 to about 1 weight percent based on the weight of the catalyst composition. Lower concentrations are preferred to reduce cost but it is believed that the concentration of platinum should be at least about 0.3 weight percent based on the weight of the catalyst composition.

Any suitable concentration of the promoter may be utilized in the catalyst composition. The concentration of the promoter, expressed as the oxide, will generally be in the range of about 0.1 to about 20 weight percent based on the weight of the catalyst composition and will preferably be in the range of about 0.4 to about 5 weight percent based on the weight of the catalyst composition.

Any suitable alumina support material may be utilized in the catalyst composition. As used herein, the term alumina support refers to a support which is predominantly alumina. A high purity gamma alumina is the preferred support. However, the alumina support may contain minor amounts (0.5 wt %–10 wt %) of other support materials such as silica, titania, zirconia, etc. Generally, the surface area ($BET/N_2$) of the support is about 100–300 m²/g.

Either the elemental form of platinum or the promoter or any suitable compound of platinum or the promoter may be utilized to form the catalyst composition.

Platinum compounds suitable for use in preparing the catalyst composition are $PtCl_2$, $PtCl_4$, $H_2PtCl_6$, $PtBr_4$, $PtI_4$, $[Pt(NH_3)_4]Cl_2$ and $[PtCl_2(NH_3)_2]$. $H_2PtCl_6$ is the preferred platinum compound.

Promoter compounds suitable for use in preparing the catalyst composition are those directly convertible to the oxide form when being calcined. Examples of suitable promoter compounds are $Sc(NO_3)_3$, $Y(NO_3)_3$, $La(NO_3)_3$, $Ce(NO_3)_3$, $Sc(CH_3CO_2)_3$, $Y(CH_3CO_2)_3$, $La(CH_3CO_2)_3$, $Ce(CH_3CO_2)_3$, $Sc_2(C_2O_4)_3$ (Sc oxalate), $Y_2(C_2O_4)_3$, $Sc_2(SO_3)_3$, $Y_2(SO_3)_3$, $Sc_2(SO_4)_3$, $Y(SO_4)_3$, $La_2(SO_4)_3$, $Sc(HCO_3)_3$, $Y(HCO_3)_3$ $La(HCO_3)_3$. Preferred are $Sc(NO_3)_3$ and $Y(NO_3)_3$.

The catalyst composition may be prepared by any method known to the art. Preferably, the promoter compound is added to a high purity gamma alumina support by impregnating the alumina with a solution—aqueous or organic—that contains the promoter compound. After the promoter compound has been added to the alumina, the alumina is dried and is then preferably calcined in air at a temperature in the range of about 400° C. to about 600° C. to convert the promoter to the oxide form. The platinum is then added by the same impregnation process. The resulting catalyst is then again dried and finally calcined in the air, at a temperature in the range of about 500° C. to about 600° C. to form the catalyst of the present invention.

It is noted that the platinum and promoter may both be added to the alumina prior to the final calcining step. However, it is preferred to add the promoter compound first and calcine the alumina which has been impregnated with only the promoter to enable the oxide of the promoter to coat the alumina as completely as possible so that the oxide of the promoter can interact with the subsequently added platinum compound.

Any suitable hydrocarbon-containing feed stream may be hydrofined using the above described catalyst composition in accordance with the present invention. Suitable hydrocarbon-containing feed streams include petroleum products, coal, pyrolyzates, products from extraction and/or liquefaction of coal and lignite, products from tar sands, products from shale oil and similar products. Suitable hydrocarbon feed streams include gas oil having a boiling range from about 205° C. to about 538° C., topped crude having a boiling range in excess of about 343° C. and residuum. However, the present invention is particularly directed to heavy feed streams such as heavy topped crudes and residuum and other materials which are generally regarded as too heavy to be distilled. These materials will generally contain the highest concentrations of metals, sulfur, nitrogen and Ramsbottom carbon residues.

It is believed that the concentration of any metal in the hydrocarbon-containing feed stream can be reduced using the above described catalyst composition in accordance with the present invention. However, the present invention is particularly applicable to the removal of vanadium, nickel and iron.

The sulfur which can be removed using the above described catalyst composition in accordance with the present invention will generally be contained in organic sulfur compounds. Examples of such organic sulfur compounds include sulfides, disulfides, mercaptans, thiophenes, benzylthiophenes, dibenzylthiophenes, and the like.

The nitrogen which can be removed using the above described catalyst composition in accordance with the present invention will also generally be contained in organic nitrogen compounds. Examples of such organic nitrogen compounds include amines, diamines, pyridines, quinolines, porphyrins, benzoquinolines and the like.

The hydrofining process can be carried out by means of any apparatus whereby there is achieved a contact of the catalyst composition with the hydrocarbon containing feed stream and hydrogen under suitable hydrofining conditions. The hydrofining process is in no way limited to the use of a particular apparatus. The hydrofining process can be carried out using a fixed catalyst bed, a fluidized catalyst bed, a moving catalyst bed or in a slurry-type operation. Presently preferred is a fixed catalyst bed.

Any suitable reaction time between the catalyst composition and the hydrocarbon-containing feed stream may be utilized. In general, the reaction time will range from about 0.1 hours to about 10 hours. Preferably, the reaction time will range from about 0.3 to about 5 hours. In a fixed catalyst bed operation, the flow rate of the hydrocarbon containing feed stream should be such that the time required for the passage of the mixture through the reactor (residence time) will preferably be in the range of about 0.3 to about 5 hours. This generally requires a liquid hourly space velocity (LHSV) in the range of about 0.2 to about 0.3 cc/cc/hr.

The hydrofining process can be carried out at any suitable temperature. The temperature will generally be in the range of about 250° C. to about 550° C. and will preferably be in the range of about 380° to about 440° C. Higher temperatures do improve the removal of metals but temperatures should not be utilized which will have adverse effects on the hydrocarbon-containing feed stream, such as coking, and also economic considerations must be taken into account. Lower temperatures can generally be used for lighter feeds.

Any suitable hydrogen pressure may be utilized in the hydrofining process. The reaction pressure will generally be in the range of about atmospheric to about 10,000 psig. Preferably the pressure will be in the range of about 500 to about 3,000 psig. Higher pressures tend to reduce coke formation but operation at high pressure may have adverse economic consequences.

Any suitable quantity of hydrogen can be added to the hydrofining process. The quantity of hydrogen used to contact the hydrocarbon-containing feed stock will generally be in the range of about 100 to about 20,000 standard cubic feed per barrel of the hydrocarbon-containing feed stream and will more preferably be in the range of about 1,000 to about 6,000 standard cubic feed per barrel of the hydrocarbon-containing feed stream.

In general, the catalyst composition is utilized until a satisfactory level of metals removal fails to be achieved which is believed to result from the coating of the catalyst composition with the metals being removed. It is possible to remove the metals from the catalyst composition by certain leaching procedures but these procedures are expensive and it is generally contemplated that once the removal of metal falls below a desired level, the used catalyst will simply be replaced by a fresh catalyst.

The time in which the catalyst composition will maintain its activity for removal of metals will depend upon the metals concentration in the hydrocarbon-containing feed streams being treated. It is believed that the catalyst composition may be used for a period of time long enough to accumulate 10–200 weight percent of metals, mostly Ni, V, and Fe, based on the weight of the catalyst composition, from oils.

The following examples are presented in further illustration of the invention.

EXAMPLE I

In this example the preparation of various supported platinum hydrotreating catalysts is described.

Control Catalysts

Catalyst A containing 0.5 weight-% Pt on $Al_2O_3$ was prepared as follows: 360 grams of SN-5548 Trilobe® $Al_2O_3$ (surface area as determined by $BET/N_2$: 193 $m^2/g$; pore volume as determined with Hg at 150 kpsi: 0.99 cc/g; marketed by American Cyanamid Co., Stamford, Conn.) were dried at 200° F. under vacuum conditions. Then 40 mL of a Pt solution, prepared by diluting an aqueous 50 weight-% hexachloroplatinic acid solution with approximately an equal volume of water, was added to the dried alumina under vacuum. The mixture was shaken and then kept at about 100° F. for one hour. The resulting slurry was partially dried by evacuation with a vacuum pump, and then completely dried at about 250° F. in flowing air. The dried catalyst was calcined in air at about 1000° F. for about 16 hours.

Catalyst B containing 0.1 weight-% Pt on $Al_2O_3$ was prepared by adding a mixture of 0.26 grams of an aqueous $H_2PtCl_6$ solution containing 20 weight-% Pt and 60 cc water to 45.5 grams of SN-5548 Tilobe® alumina. After shaking, the slurry was dried for about 4 hours in an oven at about 210° F. The dried Pt-impregnated $Al_2O_3$ was then calcined in air at about 930° F. for about 4 hours.

Catalyst C containing 0.1 weight-% Pt on $Al_2O_3$ plus 2 weight-% $Y_2O_3$ was prepared as follows. 7.6 grams of $Y(NO_3)_3.6H_2O$ (lot 050881; Alfa Products Division of Morton-Thiokol, Inc., Danvers, MA) were dissolved in 250 cc of water and then added to 110 grams of SN-5548 Trilobe® alumina. After soaking for 5 minutes, water was evaporated by means of a vacuum pump. The catalyst was dried at about 230° F. and then calcined in air at about 1020° F. for about 5 hours. To 45 grams of the $Al_2O_3$—$Y_2O_3$ support was added a mixture of 0.26 grams of an aqueous $H_2PtCl_6$ solution containing 20 weight-% Pt and 60 cc of water. Catalyst C was dried in an oven at about 230° F. for about 4 hours and was then calcined at about 930° F. for about 4 hours.

Invention Catalysts

Catalyst D containing 0.5 weight-% Pt on $Al_2O_3$ plus 0.6 weight-% $Sc_2O_3$ was prepared as follows. 1.0 grams of $Sc(NO_3)_3.9H_2O$ (Alfa Products, lot 072776) was dissolved in 65 cc of water and added to 30.0 grams of Trilobe® alumina. The mixture was stirred and then dried overnight in an oven at about 275° F. To about 45 grams of this $Sc_2O_3$-impregnated alumina was added a mixture of 1.18 grams of an aqueous $H_2PtCl_6$ solution containing 20 weight-% Pt and 50 cc of water. The slurry was stirred and then dried overnight in oven at about 230° F. The dried catalyst D was calcined for about 2 hours at about 750° F. and then for about 2 hours at about 930° F.

Catalyst E containing 0.5 weight-% Pt on $Al_2O_3$ plus 2.0 weight-% $Y_2O_3$ was prepared as follows: To 110 grams of Trilobe® alumina was added a solution of 7.6 grams of $Y(NO_3)_3 \div 6H_2O$ (Alfa Products) in 250 cc of water. The slurry was stirred and then evaporated to dryness on a hot plate. The dried $Al_2O_3$—$Y_2O_3$ support was calcined at about 840° F. for about 16 hours in air. To 45.5 grams of this material was added a mixture of 1.18 grams of an aqueous $H_2PCl_6$ solution containing 20 weight-% Pt and 50 cc of water. The slurry was dried by heating in an oven at about 320° F. for about 24 hours. The dried slurry was then calcined in air at about 400° F. for about 1 hour and at about 1000° F. for about 2 hours.

EXAMPLE II

This example illustrates the experimental setup for investigating the demetallization of heavy oils by employing various supported platinum catalysts. Oil was pumped by means of a LAPP Model 211 (General Electric Company) pump to a metallic mixing T-pipe where the oil was mixed with a controlled amount of hydrogen gas. This mixture was pumped downward through a stainless steel trickle bed reactor, 28.5 inches long and 0.75 inches in diameter, fitted inside with a 0.25 O.D. axial thermocouple well. The reactor was filled with a top layer (3.5 inches below the oil/$H_2$ feed inlet) of 50 cc of low surface area (less than 1 $m^2$/gram) $\alpha$-alumina, a middle layer of 50 cc of one of the catalysts, and a bottom layer of 50 cc of $\alpha$-alumina. The reactor tube was heated by a Thermcraft (Winston-Salem, N.C.) Model 211 3-zone furnace. The reactor temperature was usually measured in four locations along the reactor bed by a traveling thermocouple that was moved within the axial thermocouple well. The liquid product was collected in a receiver, filtered through a glass frit, and analyzed. Exiting hydrogen gas was vented. Vanadium and nickel content in oil was determined by plasma emission analysis.

The feed was a mixture of 26 weight-% toluene and 74 weight-% Venezuelan Monagas pipeline oil having an API gravity of about 17–18, a sulfur content of about 2.2 wt-% and a Ramsbottom carbon content of about 8.5 wt-%. The hydrogen pressure was maintained at about 1000 psig in all experiments, which generally lasted from about 2 to 6 hours. The reactor temperature (average of thermocouple readings at four reactor locations) was either 400° C. or 425° C. The liquid hourly space velocity (LHSV) of the oil feed ranged from about 0.5 to about 1.6 cc/cc catalyst/hour.

EXAMPLE II

Results of fifteen heavy oil demetallization runs using catalysts A, D and E (containing 0.5 weight-% Pt), in accordance with the procedure described in Example II, are summarized in Table I.

TABLE I

| Run | Temp (°C.) | LHSV (cc/cc/hr) | Catalyst | Run Time (Hrs.) | Feed ppm V | Feed ppm Ni | Feed ppm (V + Ni) | Product ppm V | Product ppm Ni | Product ppm (V + Ni) | % Removal of (V + Ni) |
|---|---|---|---|---|---|---|---|---|---|---|---|
| 1 (Control) | 425 | 1.58 | A[(1)] | 2.5 | 264 | 66 | 330 | 101 | 29 | 130 | 61 |
| 2 (Invention) | 425 | 1.42 | D[(2)] | 2.0 | 307 | 77 | 384 | 113 | 36 | 149 | 61 |
| 3 (Invention) | 425 | 1.42 | E[(3)] | 2.5 | 280 | 63 | 343 | 46 | 17 | 63 | 82 |

TABLE I-continued

| Run | Temp (°C.) | LHSV (cc/cc/hr) | Catalyst | Run Time (Hrs.) | Feed ppm V | ppm Ni | ppm (V + Ni) | Product ppm V | ppm Ni | ppm (V + Ni) | % Removal of (V + Ni) |
| --- | --- | --- | --- | --- | --- | --- | --- | --- | --- | --- | --- |
| 4 (Control) | 425 | 1.00 | A | 3.1 | 264 | 66 | 330 | 49 | 19 | 68 | 79 |
| 5 (Invention) | 425 | 1.03 | D | 3.0 | 307 | 77 | 384 | 50 | 20 | 70 | 82 |
| 6 (Invention) | 425 | 1.08 | E | 3.2 | 280 | 63 | 343 | ~0 | 25 | 25 | 93 |
| 7 (Control) | 400 | 1.60 | A | 2.0 | 264 | 66 | 330 | 164 | 49 | 213 | 35 |
| 8 (Invention) | 400 | 1.47 | D | 2.0 | 307 | 77 | 384 | 156 | 46 | 202 | 47 |
| 9 (Invention) | 400 | 1.49 | E | 2.0 | 280 | 63 | 343 | 166 | 50 | 216 | 37 |
| 10 (Control) | 400 | 1.09 | A | 3.0 | 264 | 66 | 330 | 126 | 38 | 164 | 50 |
| 11 (Invention) | 400 | 1.02 | D | 3.0 | 307 | 77 | 384 | 92 | 28 | 120 | 69 |
| 12 (Invention) | 400 | 1.03 | E | 3.6 | 280 | 63 | 343 | 130 | 39 | 169 | 51 |
| 13 (Control) | 400 | 0.50 | A | 6.0 | 264 | 66 | 330 | 62 | 24 | 86 | 74 |
| 14 (Invention) | 400 | 0.46 | D | 6.5 | 307 | 77 | 384 | 40 | 19 | 59 | 85 |
| 15 (Invention) | 400 | 0.48 | E | 6.5 | 280 | 63 | 343 | 57 | 24 | 81 | 76 |

(1)A: 0.5 weight % Pt on $Al_2O_3$
(2)D: 0.5 weight % Pt on $Al_2O_3$ plus 0.6 weight % $Sc_2O_3$
(3)E: 0.5 weight % Pt on $Al_2O_3$ plus 2.0 weight % $Y_2O_3$ Data in Table I show that generally the removal of metals (V, Ni) from oil by hydrotreatment on alumina-supported catalysts containing 0.5 weight-% Pt was unexpectedly enhanced by the presence of $Sc_2O_3$ or $Y_2O_3$ in the support. It is also believed that sulfur was removed and Ramsbottom carbon content reduced.

Based on the results set forth in Table I, it is also believed that a lanthanide oxide would produce a beneficial effect if used as a promoter.

EXAMPLE IV

Results of ten hydrodemetallization runs outside the scope of this invention employing catalysts B and C (containing only 0.1 weight Pt), also in accordance with the procedure described in Example II, are summarized in Table II.

TABLE II

| Run | Temp (°C.) | LHSV (cc/cc/hr) | Catalyst | Run Time (Hrs.) | Feed ppm V | ppm Ni | ppm (V + Ni) | Product ppm V | ppm Ni | ppm (V + Ni) | % Removal of (V + Ni) |
| --- | --- | --- | --- | --- | --- | --- | --- | --- | --- | --- | --- |
| 16 (Control) | 425 | 1.44 | B(1) | 2.0 | 294 | 71 | 365 | 101 | 33 | 134 | 63 |
| 17 (Control) | 425 | 1.40 | C(2) | 2.0 | 291 | 70 | 361 | 104 | 34 | 138 | 62 |
| 18 (Control) | 425 | 1.04 | B | 3.0 | 294 | 71 | 365 | 90 | 29 | 119 | 67 |
| 19 (Control) | 425 | 1.07 | C | 3.0 | 291 | 70 | 361 | 108 | 33 | 141 | 61 |
| 20 (Control) | 400 | 1.46 | B | 2.0 | 294 | 71 | 365 | 162 | 46 | 208 | 43 |
| 21 (Control) | 400 | 1.40 | C | 2.0 | 291 | 70 | 361 | 156 | 43 | 199 | 45 |
| 22 (Control) | 400 | 1.07 | B | 3.0 | 294 | 71 | 365 | 191 | 53 | 244 | 33 |
| 23 (Control) | 400 | 1.11 | C | 3.0 | 291 | 70 | 361 | 175 | 49 | 224 | 38 |
| 24 (Control) | 400 | 0.47 | B | 6.0 | 294 | 71 | 365 | 67 | 27 | 94 | 74 |
| 25 (Control) | 400 | 0.53 | C | 6.0 | 291 | 70 | 361 | 96 | 33 | 129 | 64 |

(1)B: 0.1 weight % Pt on $Al_2O_3$
(2)C: 0.1 weight % Pt on $Al_2O_3$ plus 2.0 weight % $Y_2O_3$ Data in Table II show no consistent advantage of the presence of $Y_2O_3$ in the alumina support on the demetallization activity of catalysts with only 0.1 weight-% Pt. It is believed that at least 0.3 weight-% Pt is necessary to realize a demetallization advantage by the presence of $Sc_2O_3$, $Y_2O_3$, $La_2O_3$ or a lanthanide oxide in the alumina support.

Reasonable variations and modifications are possible within the scope of the disclosure and the appended claims to the invention.

That which is claimed is:

1. A process for hydrofining a hydrocarbon-containing feed stream comprising the step of contacting said hydrocarbon-containing feed stream under suitable hydrofining conditions with hydrogen and a catalyst composition consisting essentially of an alumina support, platinum and a promoter selected from the group consisting of scandium oxide, yttrium oxide, lanthanum oxide and oxides of elements of the lanthanide group, wherein the concentrations of platinum in said catalyst composition is at least about 0.3 weight percent based on the weight of said catalyst composition.

2. A process in accordance with claim 1 wherein said promoter is scandium oxide.

3. A process in accordance with claim 1 wherein said promoter is yttrium oxide.

4. A process in accordance with claim 1 wherein said alumina support is a high purity gamma alumina.

5. A process in accordance with claim 1 wherein the total concentration of platinum in said catalyst composition, expressed as the element, is in the range of about 0.3 to about 5 weight percent based on the weight of said catalyst composition and wherein the concentration of said promoter in said catalyst composition, expressed as the oxide, is in the range of about 0.1 weight percent to about 20 weight percent based on the weight of said catalyst composition.

6. A process in accordance with claim 5 wherein the concentration of platinum in said catalyst composition, expressed as the element, is in the range of about 0.5 to about 1 weight percent based on the weight of said catalyst composition and wherein the concentration of said promoter in said catalyst composition, expressed as the oxide, is in the range of about 0.4 to about 5 weight percent based on the weight of said catalyst composition.

7. A process in accordance with claim 1 wherein said suitable hydrofining conditions comprise a reaction time between said catalyst composition and said hydrocarbon-containing feed stream in the range of about 0.1 hour to about 10 hours, a temperature in the range of 250° C. to about 550° C., a pressure in the range of about atmospheric to about 10,000 psig and a hydrogen flow rate in the range of about 100 to about 20,000 standard cubic feet per barrel of said hydrocarbon-containing feed stream.

8. A process in accordance with claim 1 wherein said suitable hydrofining conditions comprise a reaction time between said catalyst composition and said hydrocarbon-containing feed stream in the range of about 0.3 hours to about 5 hours, a temperature in the range of 380° C. to about 440° C., a pressure in the range of about 500 to about 3,000 psig and a hydrogen flow rate in the range of about 1,000 to about 6,000 standard cubic feet per barrel of said hydrocarbon-containing feed stream.

9. A process in accordance with claim 1 wherein said hydrofining process is a demetallization process and wherein said hydrocarbon-containing feed stream contains metals.

10. A process in accordance with claim 9 wherein said metals are nickel and vanadium.

* * * * *